(12) United States Patent
Lang et al.

(10) Patent No.: US 6,352,231 B1
(45) Date of Patent: Mar. 5, 2002

(54) CLAMPING SUPPORT FOR SECURING REARVIEW MIRRORS ON MOTOR VEHICLES

(75) Inventors: Heinrich Lang, Ergersheim; Albrecht Popp, Weihenzell; Jürgen Pfanz, Schillingsfürst, all of (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/302,822

(22) Filed: Apr. 30, 1999

(51) Int. Cl.$^7$ .................................................. A47F 7/14
(52) U.S. Cl. ............... 248/475.1; 248/480; 248/229.11; 248/231.31
(58) Field of Search ...................... 248/475.1, 229.11, 248/229.21, 231.31, 480, 222.13, 222.11; 359/894; 403/355, 374.1, 379.4; 12/187

(56) References Cited

U.S. PATENT DOCUMENTS

| | | | |
|---|---|---|---|
| 2,322,431 A | * 6/1943 | Fischer | 248/476 |
| 3,170,985 A | 2/1965 | Katulich | |
| 3,291,435 A | 12/1966 | Herr | |
| 3,375,053 A | 3/1968 | Ward | |
| 3,383,152 A | 5/1968 | Ward | |
| 3,408,136 A | 10/1968 | Travis | |
| 3,424,517 A | 1/1969 | Budreck | |
| 3,448,553 A | 6/1969 | Herr et al. | |
| 3,476,464 A | 11/1969 | Clark | |
| 3,508,815 A | 4/1970 | Scheitlin et al. | |
| 3,563,638 A | 2/1971 | Panozzo | |
| 3,599,926 A | 8/1971 | Takahashi | |
| 3,609,014 A | 9/1971 | Kurz | |
| 3,889,915 A | * 6/1975 | Hashiguchi et al. | 248/475.1 |
| 4,105,295 A | 8/1978 | Skilliter, Jr. | |
| 4,125,244 A | 11/1978 | Lukey | |
| 4,174,823 A | 11/1979 | Sutton et al. | |
| 4,197,762 A | 4/1980 | Yamana | |
| 4,349,247 A | 9/1982 | Koyama et al. | |

(List continued on next page.)

FOREIGN PATENT DOCUMENTS

| | | |
|---|---|---|
| CA | 1095008 | 2/1981 |
| DE | 2537876 B2 | 3/1977 |
| DE | 9108483 | 1/1992 |
| DE | 4200744 A1 | 7/1993 |
| DE | 19513773 | 10/1995 |
| DE | 4429604 | 2/1996 |
| DE | G 8905801 | 8/1998 |
| DE | 0865967 | 9/1998 |
| EP | 0761502 B1 | 5/1989 |
| EP | 0895897 | 2/1999 |

OTHER PUBLICATIONS

Verified Translation of German Ref. No. G 91 08 483.0.
Verified Translation of German Patent No. DE 42 00 744 A1.
Verified Translation of European Patent No. EP 0 761 502 B1.
Verified Translation of German Patent No. G 89 05 801.1.

*Primary Examiner*—Anita King
*Assistant Examiner*—Naschica S. Morrison
(74) *Attorney, Agent, or Firm*—Dority & Manning, P.A.

(57) ABSTRACT

A clamping support for fastening a rearview mirror onto a vehicle is disclosed. The clamping support comprises a clamp reception fixture for attachment to the vehicle, an insertable component including a mirror end and a vehicle end, wherein the mirror end is connectable to the rearview mirror and the vehicle end is insertable in a first direction into the reception fixture, and a clamp wedge disposed within the insertable component and slidable in a second clamping direction perpendicular to the first direction. Movement of the clamp wedge in the clamping direction within the insertable component urges the clamp reception fixture and the insertable component into frictional engagement to thereby secure the rearview mirror to the vehicle. A related rear view mirror assembly is also disclosed.

12 Claims, 3 Drawing Sheets

U.S. PATENT DOCUMENTS

| | | | | |
|---|---|---|---|---|
| 4,394,066 A | * | 7/1983 | Sharp | 248/481 |
| 4,422,724 A | | 12/1983 | Otsuka et al. | |
| 4,549,786 A | | 10/1985 | Albers et al. | |
| 4,592,529 A | * | 6/1986 | Suzuki | 248/475.1 |
| 4,613,107 A | | 9/1986 | Vitaloni | |
| 4,678,294 A | | 7/1987 | Van Nostrand | |
| 4,678,295 A | | 7/1987 | Fischer | |
| 4,679,158 A | | 7/1987 | Tate | |
| 4,701,037 A | | 10/1987 | Bramer | |
| 4,764,004 A | | 8/1988 | Yamada et al. | |
| 4,824,159 A | | 4/1989 | Fluharty et al. | |
| 4,883,349 A | * | 11/1989 | Mittelhauser | 359/872 |
| 4,896,859 A | * | 1/1990 | Polzer et al. | 248/549 |
| 4,929,074 A | | 5/1990 | Urban | |
| 4,934,802 A | | 6/1990 | Fluharty, et al. | |
| 4,951,912 A | | 8/1990 | Manzoni | |
| 4,957,359 A | | 9/1990 | Kruse et al. | |
| D315,710 S | | 3/1991 | Ropolo | |
| 4,998,814 A | | 3/1991 | Perry | |
| 5,044,739 A | | 9/1991 | Santo | |
| 5,074,653 A | | 12/1991 | Mittelhäuser | |
| 5,098,058 A | * | 3/1992 | Polzer et al. | 248/549 |
| 5,115,352 A | | 5/1992 | Santo | |
| 5,137,247 A | | 8/1992 | Lang et al. | |
| 5,210,652 A | | 5/1993 | Perkinson | |
| 5,227,924 A | | 7/1993 | Kerper | |
| 5,268,795 A | | 12/1993 | Usami | |
| 5,268,797 A | | 12/1993 | Santo | |
| 5,295,021 A | | 3/1994 | Swanson | |
| 5,327,294 A | | 7/1994 | Koske et al. | |
| 5,330,149 A | * | 7/1994 | Haan et al. | 248/549 |
| 5,363,245 A | | 11/1994 | Borello | |
| 5,432,640 A | | 7/1995 | Gilbert et al. | |
| 5,477,390 A | | 12/1995 | Boddy et al. | |
| 5,477,391 A | | 12/1995 | Boddy | |
| 5,483,385 A | | 1/1996 | Boddy | |
| 5,566,030 A | | 10/1996 | Yue | |
| 5,576,884 A | | 11/1996 | Ise et al. | |
| 5,604,644 A | | 2/1997 | Lang et al. | |
| 5,615,054 A | | 3/1997 | Lang et al. | |
| 5,621,577 A | | 4/1997 | Lang et al. | |
| 5,657,174 A | | 8/1997 | Boddy | |
| D385,243 S | | 10/1997 | Lang | |
| 5,687,035 A | | 11/1997 | Lang | |
| D387,317 S | | 12/1997 | Lang | |
| 5,703,732 A | | 12/1997 | Boddy et al. | |
| 5,786,948 A | | 7/1998 | Gold | |
| D397,072 S | | 8/1998 | Hellhake, et al. | |
| 5,798,882 A | | 8/1998 | Lang | |
| D397,658 S | | 9/1998 | Kim et al. | |
| 5,823,501 A | | 10/1998 | Schmidt et al. | |
| D403,286 S | | 12/1998 | Kim et al. | |
| D403,287 S | | 12/1998 | Kim et al. | |
| D405,745 S | | 2/1999 | Stirling | |
| 5,880,895 A | | 3/1999 | Lang et al. | |
| 5,889,627 A | | 3/1999 | Englander et al. | |
| D409,127 S | | 5/1999 | Kim et al. | |
| 5,959,790 A | | 9/1999 | Hempelmann | |
| 5,963,127 A | | 10/1999 | Lang et al. | |
| 6,019,475 A | | 2/2000 | Lynam et al. | |
| D431,219 S | | 9/2000 | Englander et al. | |

* cited by examiner

CLAMPING SUPPORT FOR SECURING REARVIEW MIRRORS ON MOTOR VEHICLES

BACKGROUND OF THE INVENTION

The invention is concerned with a clamping support for the securement of rearview mirrors on motor vehicles.

Rearview mirror assemblies, such as the so-called "Horn-mirror", as it is designated in the EP-A-O 865 967, have become highly complex systems and now form a substantial volume of construction. These mirror systems were customarily screwed onto the body framing. Since these mirror systems came into great danger from theft, in the case of busses, the mirrors were not screwed on but made secure from the inside of the vehicle. This securing method made simple mounting and removal of these mirror systems desirable.

OBJECTIVES AND SUMMARY OF THE INVENTION

Thus, it is the purpose of this present invention to make available a holding means for the support of rearview mirrors which first, are secure in their function, and second, permit a simple mounting and demounting. The fulfillment of this purpose is achieved by a clamping support in accord with the generic concepts of the present invention.

The clamping support of the invention embraces: a clamp reception fixture which can be affixed to a vehicle and an insertable component with a mirror end and a vehicle end. The mirror end is connectable to the rearview mirror, and the vehicle side is insertable in the clamp reception fixture. The clamping support also contains a clamp wedge slidably placed on the insertable component which, upon being moved in the clamping direction, affixably unites the insertable component and the clamp wedge with the clamp reception fixture.

During the mounting, the insertable component is slipped into the clamp reception fixture, wherein a snap-in detent is provided.

Subsequently, the clamp wedge is forced by screw pressure, so that the side of the insertable component, remote from the clamp wedge, and the clamp wedge work against one another in opposed directions so that they become wedged in the clamp reception fixture.

Preferably, the clamp wedge on the insertable component is slidable at right angles to the entry direction of the insertable component into the clamp reception fixture. The clamp wedge, by means of the clamping screws, is made accessible from the side.

Conforming to another aspect of the invention, the clamp reception fixture is designed as a tube with a rectangular cross-section into which the insertable component is held on two opposite sides of the clamp reception fixture. The rectangular shape activates a shape fit retention of the insertable component in the clamp reception fixture.

The clamping support of the present invention, is especially adaptable to a horn shaped mirror assembly, as this is described in an application, entitled "Horn shaped rearview mirror arrangement for commercial vehicles, in particular for omnibuses" which application was filed Jan. 13, 1999, as German Application No. 199 00 987.2. Of this application, reference will be taken of all content thereof.

Further details, features and advantages of the invention arise in the following description of a preferred embodiment, with reference to the drawings.

BRIEF DESCRIPTION OF THE DRAWINGS

There is shown in.

DESCRIPTION OF THE PREFERRED EMBODIMENT

Figure 1:
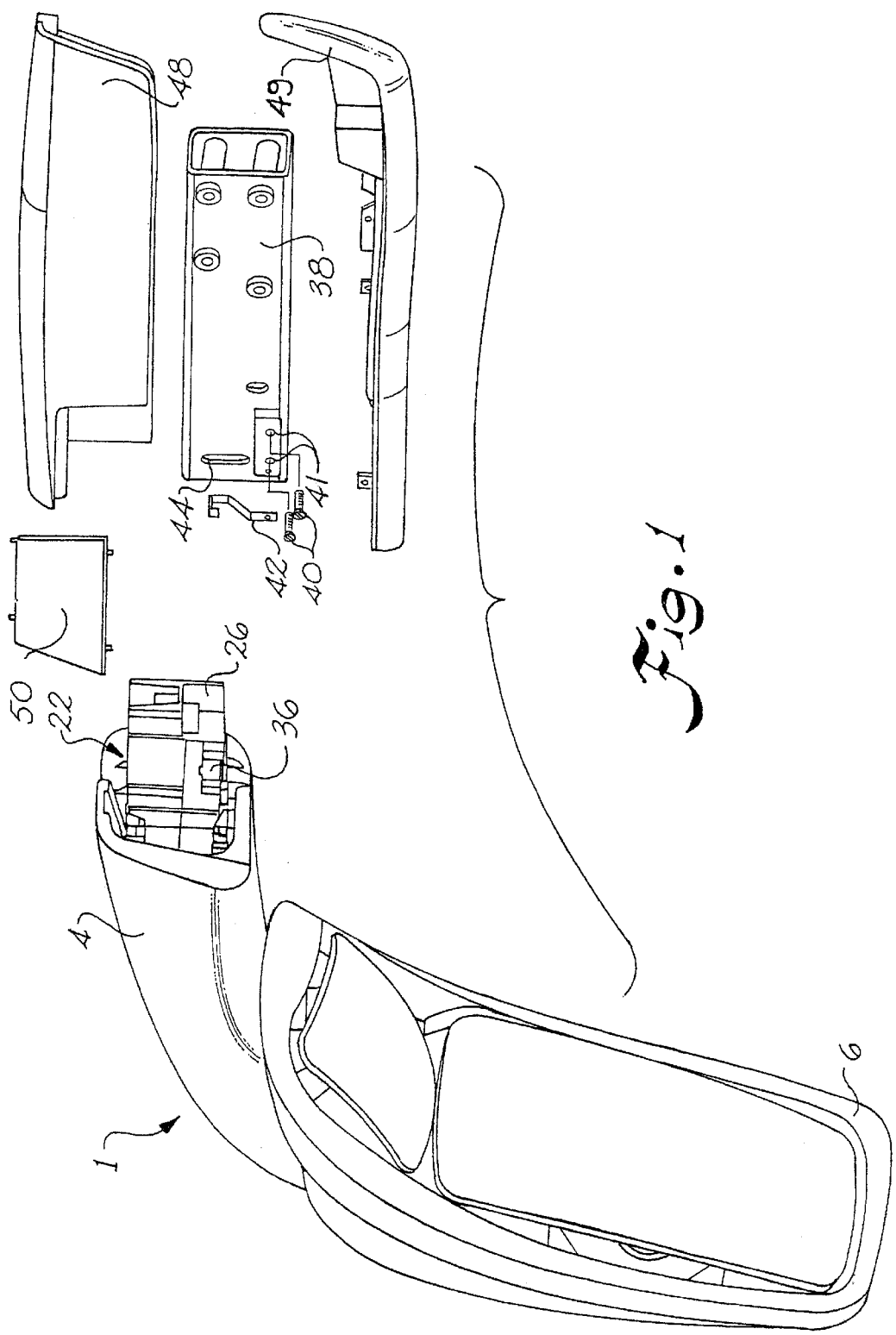
FIG. 1 a perspective, exploded drawing of the clamping support, in accord with the present invention, FIG. 2 a side view of the clamping support, in accord with the present invention, FIG. 3 a sectional view of the clamping support in accord with FIG. 2, parallel to the plane of the drawing, and FIG. 4 a diagrammatical partial sectional view of the clamp reception fixture, insertable component, and clamp wedge of FIG. 1.

Reference will now be made in detail to the presently preferred embodiments of the present invention, one or more examples of which are illustrated in the drawings. Each example is provided by way of explanation of the invention, and not meant as a limitation of the invention.

FIG. 1 shows, in perspective, a preferred embodiment of the clamping support in accord with the invention, in exploded presentation as part of a horn shaped, rearview, mirror arrangement 1 with a support arm 4 on which a mirror head 6 is affixed, as this is described in German Application No. 199 00 987.2.

Figure 3:
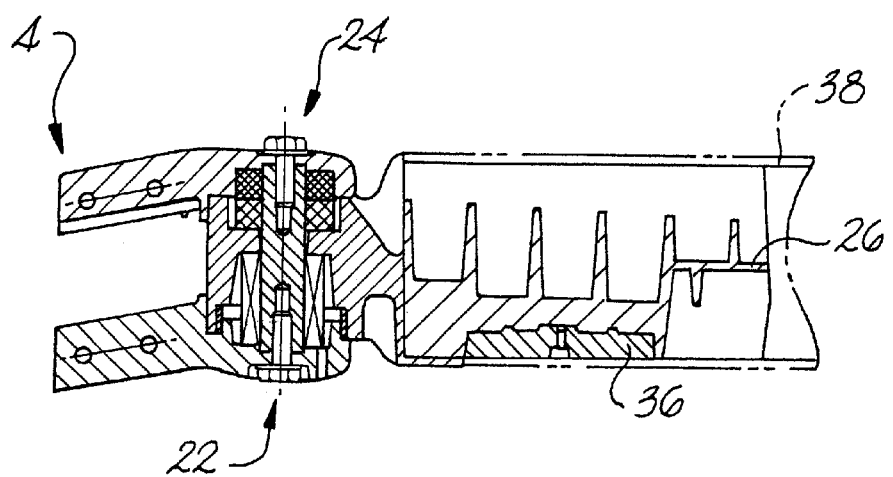
Figure 4:
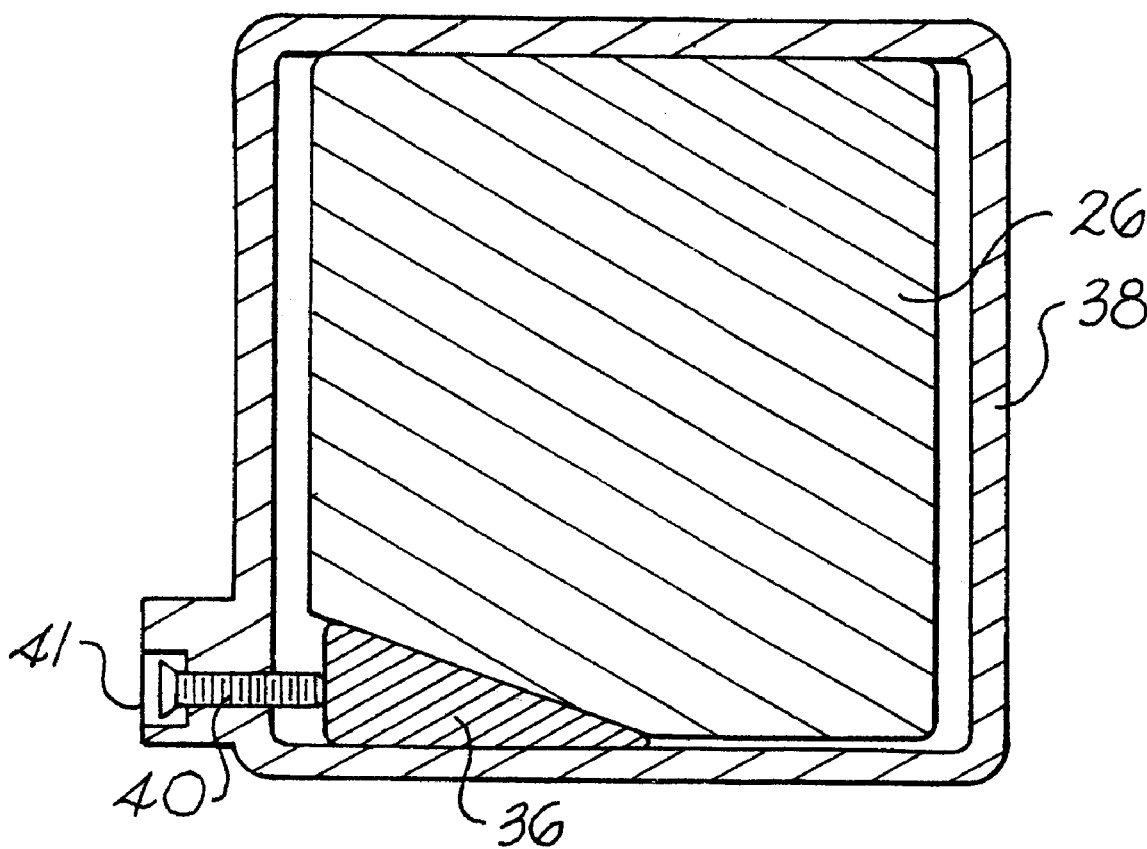

The rearview mirror arrangement 1 ends on the vehicle side in the clamping support which is a part of the present invention. Details of the example of the invented clamping support in accord with FIG. 1 are shown also in FIGS. 2 through 4.

The vehicle end of the support arm 4 is connected with an adjustment and folding apparatus 22, by means of which the basic angle adjustment of the mirror arrangement 1 allows itself to be adjusted. The mirror arrangement 1 can be folded forward in the direction of the windshield or to the rear in the direction of the side window. The adjustment and folding apparatus 22 is comprised of a hinge-like pivot 24 with two pivot arms, whereby one pivot arm is the vehicle end of the support arm 4, and the other pivot arm is part of the clamping support in accord with the invention.

The clamping support is comprised of an insertable component 26, on which a clamp wedge 36 is slidably mounted, and a rectangular clamp reception fixture 38.

The clamp reception fixture 38 is screwed onto the body of the vehicle. When mounting of the mirror assembly takes place, the insertable component 26 is pushed into the clamp reception fixture 38. Through the sliding of the clamp wedge 36 by means of clamp screws 40 extending into tapped bores 41, the insertable component is made fast. The clamp wedge 36 can be slipped in at right angles to the entry direction of the insertable component 26 into the clamp reception fixture 38. By means of the sliding of the clamp wedge 36 as the screws 40 are driven into the tapped bores 41, the insertable component 26 is pressed upward and the clamp wedge 36 pressed downward against the upper surface of the underside of the clamp reception fixture 38 respectively (see FIG. 4).

On the basis of security, a snap-in holding device is provided, which is comprised of a snap-in detent 42 fastened onto the clamp reception fixture 38. This snap-in detent 42 protrudes through a penetrative opening 44 in the clamp reception fixture 38. Upon the entry of the insertable component 26 into the clamp reception fixture 38, the snap-in detent 42 retracts, that is, is pressed back, and then springs back into a corresponding recess in the insertable component 26.

The clamping support is protected by an upper and lower covering, respectively 48 and 49, as well as by a mounting cover 50. The mounting cover 50 protects the clamp screws 40 and the snap-in detent 42. For disassembly of the mirror assembly, or the demounting of the mirror head 6 with the support arm 4, the mounting cover 50 must be removed and the clamp screws loosened.

Figure 2:
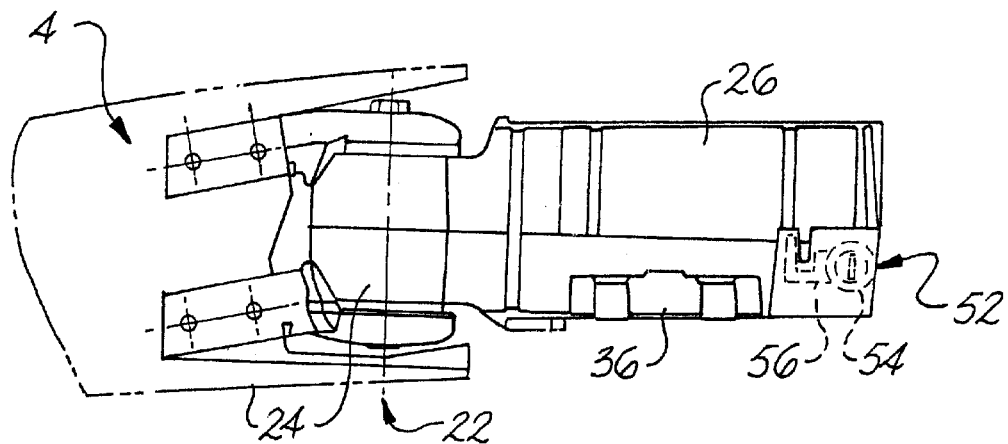

In FIG. 2, a locking device 52 is shown which requires a key for activation and is placed on the clamp reception fixture 38. By means of this locking device, the insertable component 26 can be untamperably secured in the clamp reception fixture 38. The locking device 52 is comprised of a locking cylinder 54, which is turnable by the key, and onto which a hook is affixed. By turning the locking cylinder 54 with an appropriate key, the hook 56 locks into the insertable component 26, and, likewise, can be unlocked therefrom. This locking device 52 serves as an assurance against theft.

This clamping support, in accord with the present invention, permits the fastening of the most varied types of rearview mirror assemblies onto vehicles.

It will be apparent to those skilled in the art that various modifications and variations can be made is the present invention without departing from the scope and spirit of the invention. It is intended that the present invention include such modifications and variations as come within the scope of the appended claims and their equivalents.

What is claimed is:

1. A clamping support for fastening a rearview mirror onto a vehicle, the clamping support comprising:
    a clamp reception fixture for attachment to the vehicle;
    an insertable component including a mirror end and a vehicle end, wherein the mirror end is connectable to the rearview mirror and the vehicle end is insertable in a first direction into the reception fixture; and
    a clamp wedge disposed within the insertable component and slidable in a second clamping direction perpendicular to the first direction, movement of the clamp wedge in the clamping direction within the insertable component urging the clamp reception fixture and the insertable component into frictional engagement to thereby secure the rearview mirror to the vehicle.

2. A clamping support as in claim 1, wherein the vehicle end of the insertable component has a substantially rectangular cross section.

3. A clamping support as in claim 2, wherein the clamp reception fixture is shaped in a rectangular tube for matingly receiving the vehicle end.

4. A clamping support as in claim 1, further comprising a snap-in detent secured to the clamp reception fixture, wherein the snap-in detent selectively penetrates the insertable component and releasably interlocks the clamp reception fixture to the insertable component.

5. A clamping support as in claim 1, wherein clamp screws extending through the clamp reception fixture move the clamp wedge in the clamping direction.

6. A clamping support as in claim 5, wherein the clamp screws extend through tapped borings in the clamp reception fixture.

7. A clamping support as in claim 1, further comprising a locking device disposed on the clamp reception fixture for further securing the insertable component to the clamp reception fixture.

8. A clamping support as in claim 7, wherein the locking device includes a locking cylinder and a detent hook, wherein the detent hook interlocks with a portion of the insertable component when the locking cylinder is locked.

9. A clamping support as in claim 1, wherein the mirror end of the insertable component comprises a vehicle end pivot arm of an adjustment and folding apparatus for holding a support arm of the rearview mirror.

10. A rearview mirror assembly for attachment to a clamp reception fixture extending from a vehicle, the rearview mirror assembly comprising:
    a mirror support arm;
    a mirror secured to the mirror support arm;
    an insertable component including a mirror end secured to the mirror support arm and a vehicle end insertable in a first direction into the reception fixture;
    a clamp wedge disposed within the insertable component and slidable in a second clamping direction perpendicular to the first direction;
    at least one clamp screw for slidably moving the clamp wedge in the clamping direction to frictionally secure the insertable component to the clamp reception fixture.

11. A clamping support as in claim 10, wherein the clamp screw extends through a tapped boring in the clamp reception fixture.

12. A clamping support as in claim 10, wherein the insertable component mirror end is pivotally mounted to the mirror support arm.

* * * * *